United States Patent [19]
Flath et al.

[11] Patent Number: 5,982,422
[45] Date of Patent: Nov. 9, 1999

[54] ACCELERATED IMAGING TECHNIQUE USING PLATINUM SILICIDE CAMERA

[75] Inventors: Laurence Flath; Eustace L. Dereniak, both of Pima County, Ariz.; John P. Garcia, San Diego County, Calif.; Steven M. Shepard, Oakland County, Mich.

[73] Assignee: The United States of America as represented by the Secretary of the Army, Washington, D.C.

[21] Appl. No.: 08/262,296

[22] Filed: Jun. 20, 1994

Related U.S. Application Data

[63] Continuation of application No. 08/080,163, Jun. 22, 1993, abandoned.

[51] Int. Cl.[6] .............................. H04N 5/225; H04N 3/14; H04N 5/335
[52] U.S. Cl. .......................... 348/216; 348/296; 348/297; 348/314
[58] Field of Search ..................................... 348/216, 297, 348/296, 220, 314, 230; H04N 5/335

[56] References Cited

U.S. PATENT DOCUMENTS

| | | | |
|---|---|---|---|
| 4,791,307 | 12/1988 | Kawajiri et al. | 348/280 |
| 4,800,435 | 1/1989 | Ikeda et al. | 348/296 |
| 4,984,002 | 1/1991 | Kokubo | 348/296 |
| 5,025,319 | 6/1991 | Mutoh et al. | 348/296 |
| 5,027,215 | 6/1991 | Takayama et al. | 348/314 |
| 5,051,832 | 9/1991 | Losee et al. | 348/220 |
| 5,057,926 | 10/1991 | Watanabe | 348/314 |
| 5,140,426 | 8/1992 | Oda | 348/296 |
| 5,233,428 | 8/1993 | Alford et al. | 348/230 |

Primary Examiner—Bipin H. Shalwala
Attorney, Agent, or Firm—Peter A. Taucher; David L. Kuhn

[57] ABSTRACT

Disclosed is a method to image events with a camera having a focal plane array of sensors on a charge coupled device whose parallel vertical registers clock signal charges to a horizontal register. The method includes sending a first clock signal to first gates on vertical register zones proximal to the sensors, and sending a second clock signal to second gates on distal vertical register zones remote from the sensors. A first transfer pulse on the first clock signal causes first signal charges in the sensors to transfer to the proximal zones, and then the first signal charges dissipate into the substrate of the charge coupled device. A second transfer pulse of the first clock signal occurs at a predetermined interval after the first transfer pulse and second signal charges transfer to the proximal zone. The second signal charges are clocked off the charge coupled device to become part of a video signal.

8 Claims, 7 Drawing Sheets

ACCELERATED IMAGING TECHNIQUE USING PLATINUM SILICIDE CAMERA

This application is a continuation of application Ser. No. 08/080,163 filed Jun. 22, 1993, now abandoned.

GOVERNMENT USE

The invention described herein may be manufactured, used and licensed by or for the U.S. Government for governmental purposes without payment to us of any royalty thereon.

BACKGROUND AND SUMMARY

In conventional video systems for imaging phenomena in the infrared range, image quality constraints typically limit camera speed to a frame rate in the range of 30 to 45 Hertz. However, it is often desired to capture images of such phenomena occurring faster than these frame rates. In order to capture infrared images of high speed phenomena, we have developed a technique to reduce effective exposure time of a conventional staring mode camera by modifying clock signals that control sensors on the camera's focal plane array. With modified clock signals, the camera can operate with an effective frame rate of 100 kiloHertz. Additionally, our technique uses camera control hardware which creates the option of initializing clock signals in response to a trigger signal sent in response to a flagging, or precursor, signal generated before the event of interest at the target to be imaged. In addition, the camera can be programmed to create a series of images showing progressive stages of a high speed event.

DETAILED DESCRIPTION

Figure 1:
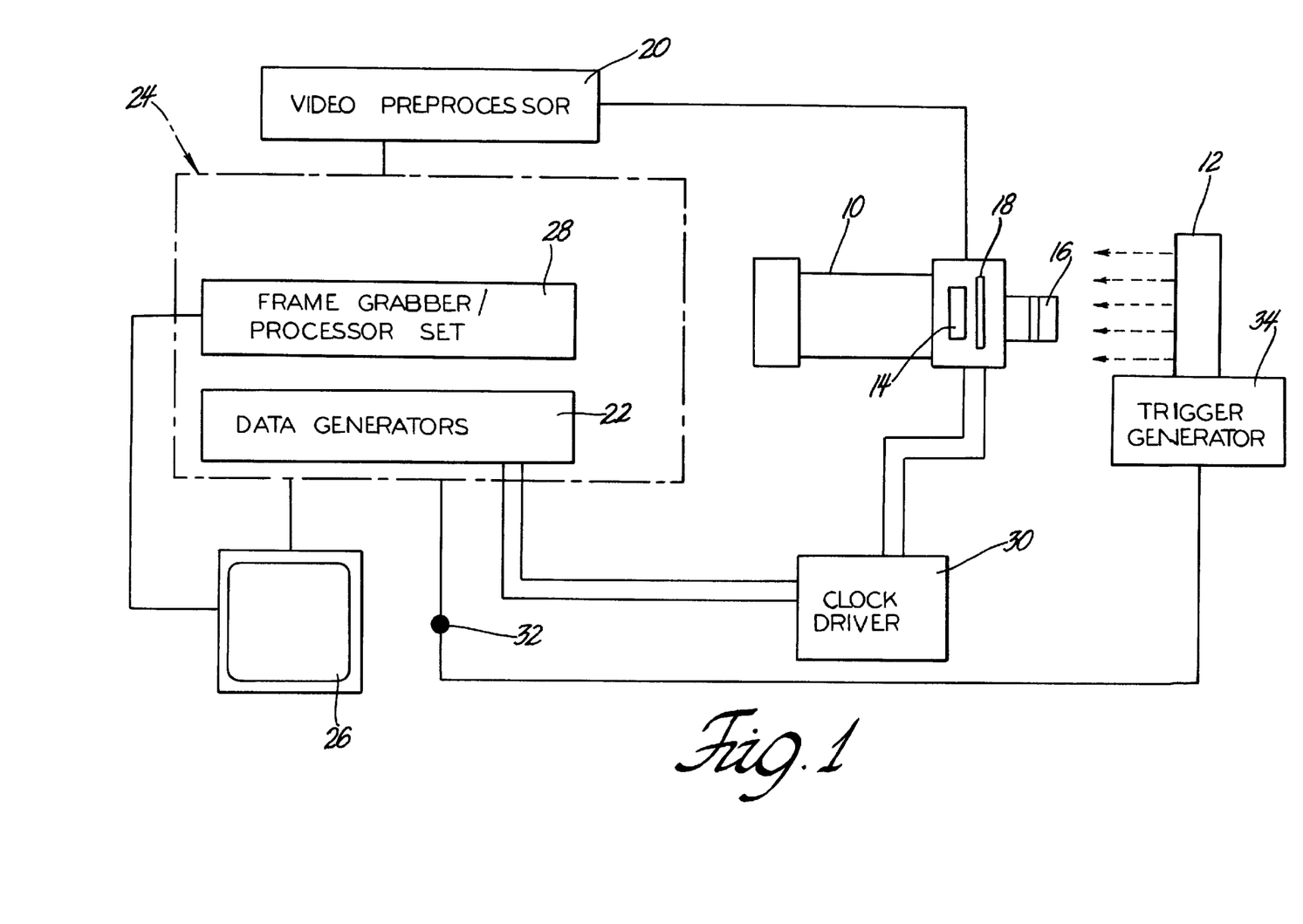
FIG. 1 is a diagram of the hardware used in our accelerated imaging technique.

In FIG. 1 is shown a diagram of the hardware used in our imaging technique wherein camera 10 receives infrared light from target 12. Target 12 can be a high frequency event such as fan blade rotation, or thermal variations of an oscillating transistor, or rapid thermal transients during flame propagation in an engine cylinder. Lens configuration 16 of camera 10 typically includes an f/2.0 cold stop, sapphire window and f/1.6 Germanium/Silicon doublet lens. A filter wheel 18 is disposed between lens configuration 16 and the camera's focal plane. Camera 10 has an image receiving assembly 14 comprised of infrared sensors arrayed in the camera focal plane on a charge coupled device (CCD). The CCD receives photoelectric charges from the sensors and then clocks the charges in known fashion to a horizontal register. In our experiments, the particular sensor array used was an RCA David Sarnoff 320×244 (column×row) interline transfer array of platinum silicide Schottky barrier diodes detecting infrared radiation in the 3 to 5 micrometer range. The interline transfer array is composed of two separate arrays each having 122 sensors per column and 320 sensors per row, the rows of one separate array alternated with rows of the other. The rows of the one separate array are referred to as the even field and the rows of the other separate array are referred to as the odd field. Both the even and the odd fields are connected to a common set of parallel vertical registers.

A raw video signal comes from the horizontal register of camera 10 to video preprocessor 20 which amplifies the signal, and then sends the signal to a controller-processor means such as a 486 33 MHz personal computer shown by dashed lines at 24. The video signal is mixed with synchronization signals and blanking signals provided by data generator 22, the data generator typically being comprised of one or more electronics boards in computer 24. The resulting video signal is in the form of a standard RS-170 video output and can be sent directly to monitor 26 for viewing. In the alternative, the resulting signal can be sent to a set of boards 28 on computer 24 whose functions include frame grabbing and frame processing before the this signal is sent to a monitor.

Data generator 22 controls clock driver 30 and clock driver 30 responds by sending a set of clock signals to the CCD on which array 14 is mounted. The set of clock signals includes four clock signals for the vertical registers of the CCD and clock signals for the horizontal register of the CCD. Computer 24 is programmed to have one selectable mode where data generator 22 initializes clock driver 30 only when computer 24 receives a trigger signal through external trigger terminal 32, whereby clock signals start to the CCD after the trigger signal. Computer 24 has another selectable mode where data generator 22 initializes clock driver in response to signals generated within the computer, and in a third selectable computer mode, clock driver 30 simply sends uninterrupted clock signals to the CCD. Trigger signals will originate at trigger generator 34, which sends the trigger signals in response to an event at target 12. If the target were rotation of a fan blade, for example, the blade's arrival at a given angular position could interrupt a light beam in the blade's path to generate the trigger signal.

Figure 2:
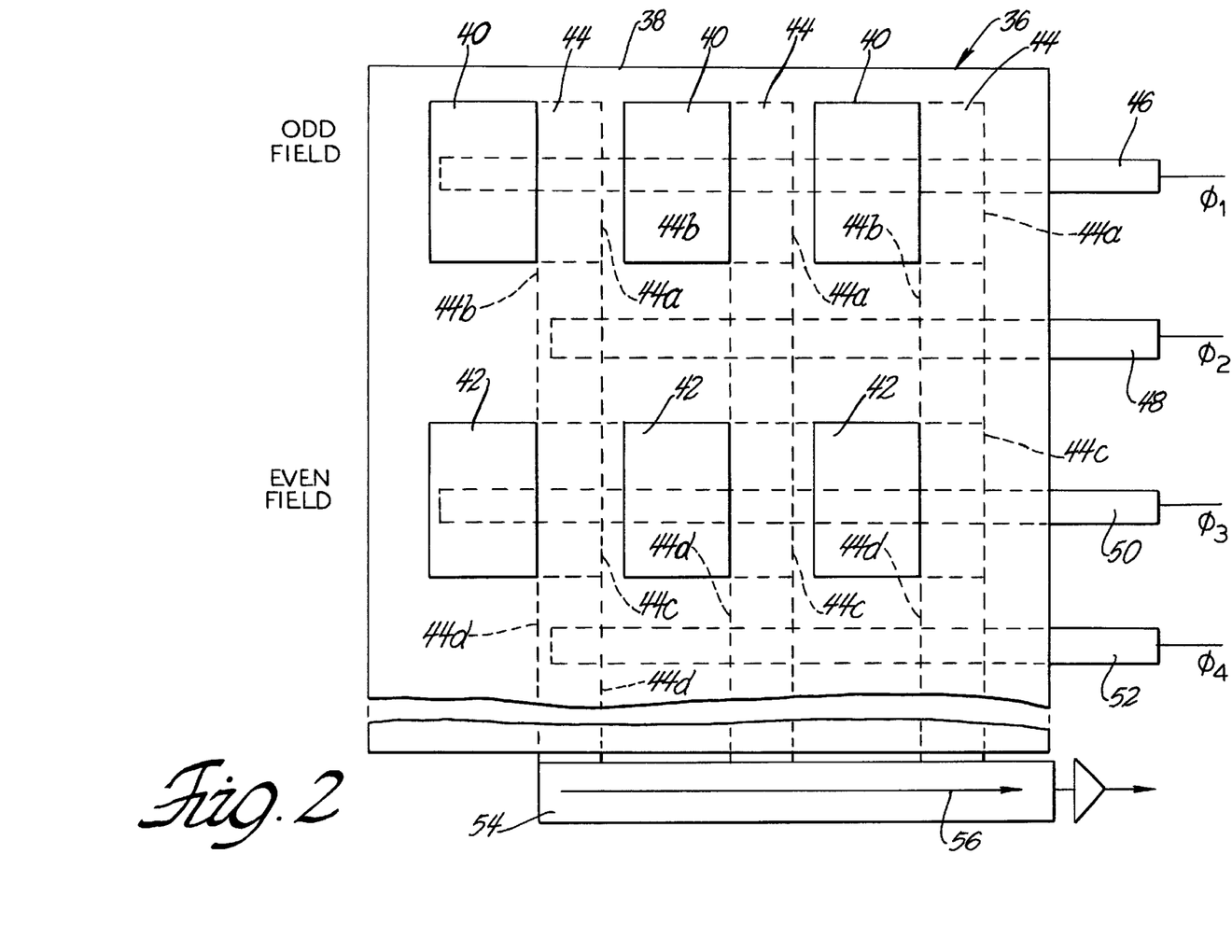
FIG. 2 is a simplified diagram of a focal plane array of photosensitive elements on a charge coupled device (CCD) used for our technique.
Figure 3:
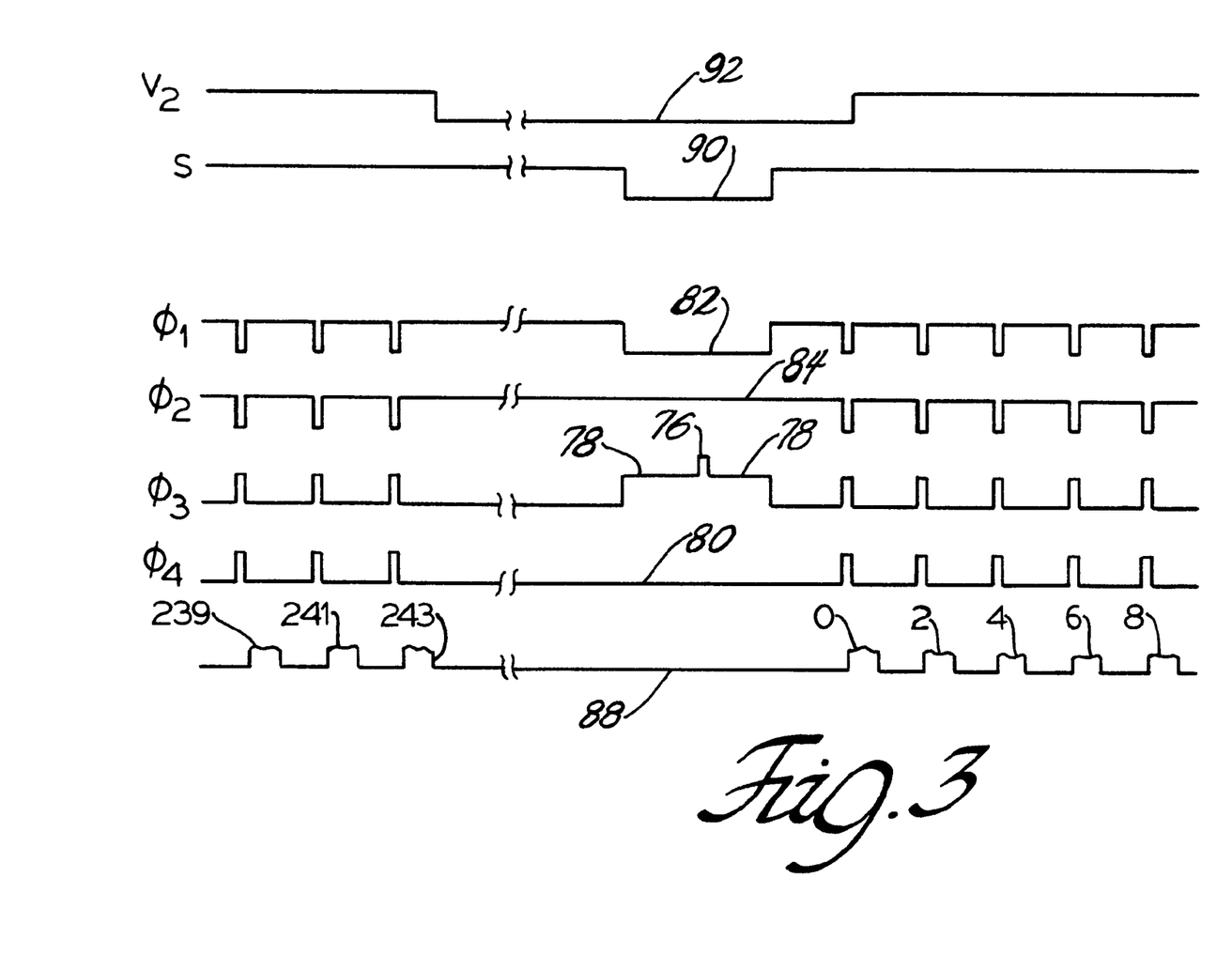
FIG. 3 shows the temporal alignment of clock signals to the CCD conventionally used to transfer signal charges from photosensitive elements in the even fields of the focal plane array.
Figure 4:
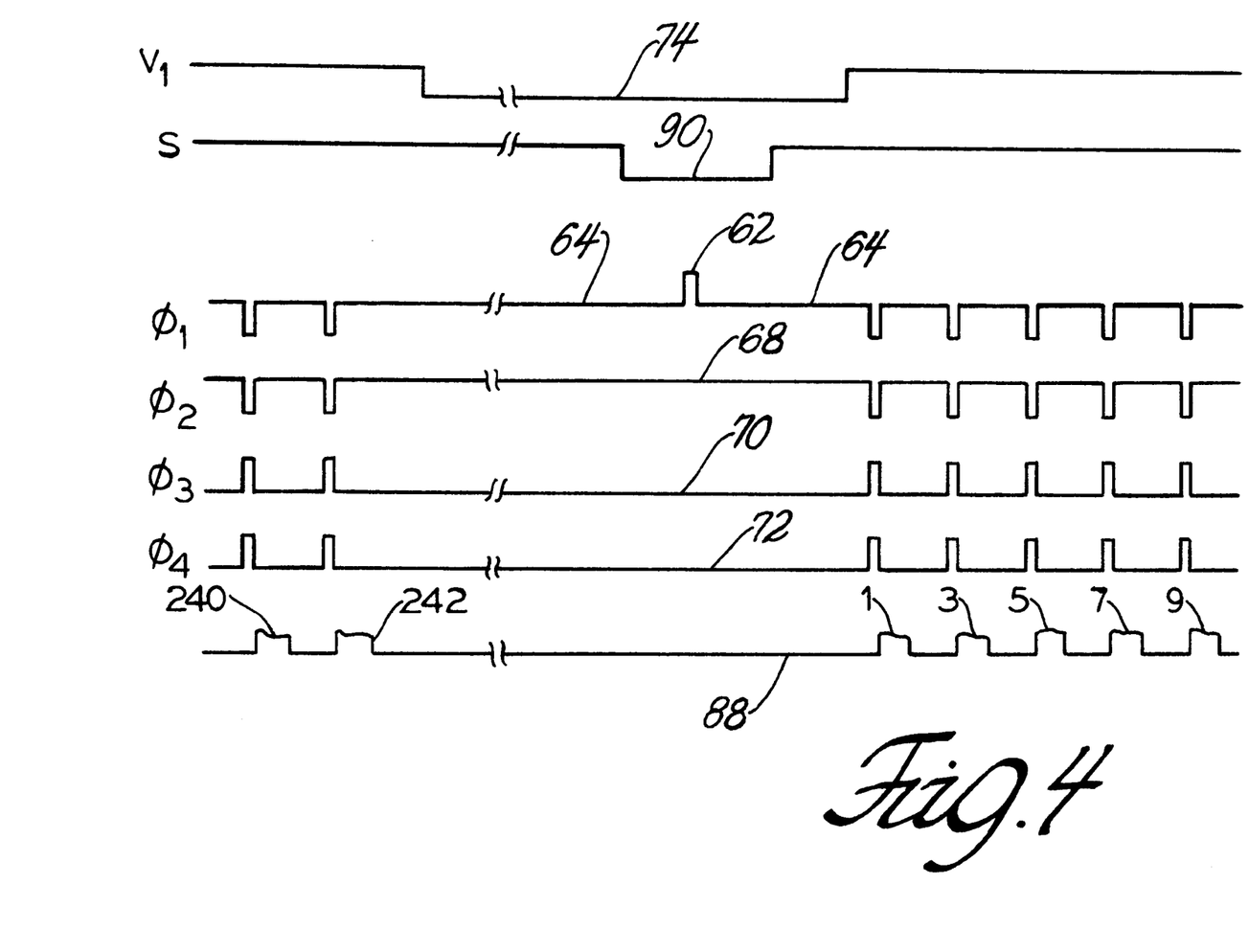
FIG. 4 shows the temporal alignment of clock signals to the CCD conventionally used to transfer the signal charges from photosensitive elements in the odd fields of the focal plane array.

The typical operation of a conventional image receiving assembly (of which assembly 14 is an example) can perhaps be best explained in conjunction with FIGS. 2, 3 and 4. FIG. 2 is a simplified model of a conventional image receiving assembly 36 where the CCD has a silicon substrate 38 on which are secured a first row of sensors 40 in an odd field. Also secured on substrate 38 is a second, parallel row of sensors 42 in an even field of an interline sensor array. Buried within substrate 38 is a vertical register 44 for each column of sensors, the vertical registers providing a path for signal charges from the sensors to be clocked off assembly 36. The vertical registers are comprised of adjoining zones 44a, 44b, 44c and 44d which act as temporary rest sites for the signal charges as they are clocked, or read, out of the vertical registers into horizontal register 54 of assembly 36. In other words, these charges index from one zone to the next at controlled time intervals and are thus "clocked" off the vertical registers to horizontal register 54. The signal charges from any given row of sensors are clocked simultaneously in parallel to horizontal register 54. It will be noted that registers 44 must be buried in substrate 38 in order for the CCD to operate as later explained in conjunction with FIGS. 3 through 6.

The CCD of assembly 36 also includes conventional signal carrying elements 46, 48, 50 and 52 which carry periodic clock signals $\phi_1$, $\phi_2$, $\phi_3$ and $\phi_4$ respectively that originate from a clock driver such as clock driver 30 in FIG. 1. Element 46 contacts zones 44a, element 48 contacts zones 44b, element 50 contacts zones 44c, and element 52 contacts zones 44d. Signal charges collected by horizontal register 54 are clocked in direction 56 to amplifier 58 typically on the CCD. Thereafter the signal charges can be transmitted to processing circuitry such as video preprocessor 30 in FIG. 1. The clocking function of register 54 is controlled in known fashion by horizontal clock signals received by register 54 from control circuitry such as a programmable logic array in clock driver 30.

During normal operation of camera 10, infrared light strikes sensors 40 and sensors 42 and creates photoelectric charges therein. Subsequently these photoelectric charges are transferred as signal charges to the vertical registers 44. Then the signal charges are clocked to horizontal register 54 and afterward sent to preprocessor 20. The temporal juxtaposition and configurations of periodic clock signals $\phi_1$, $\phi_2$, $\phi_3$, and $\phi_4$ effecting transfer of photoelectric charges as signal charges to the vertical registers are shown in FIGS. 3 and 4. FIG. 3 is a clock signal alignment where photoelectric charges transfer from sensors in a typical even field to vertical registers. FIG. 4 is a clock signal where photoelectric charges transfer from sensors in a typical odd field to the vertical registers.

Referring now to FIG. 4, the transfer of photoelectric charges from odd-fields of sensors 40 in a typical sensor array to vertical sensors is caused by a high level transfer signal component 62 on signal $\phi_1$, component 62 being immediately preceded and followed by intermediate voltage level signal component 64. Contemporaneous with signal component 62 are intermediate voltage level signal component 68 of clock signal $\phi_2$, low voltage signal component 70 on clock signal $\phi_3$, and low voltage signal component 72 on clock signal $\phi_4$. At the time of the odd-field transfer, intermediate voltage components 64 and 68 are physically adjacent in respective clock signals $\phi_1$ and $\phi_2$ in FIG. 2. Components 64 and 68 now cause signal charges transferred by component 62 from sensors 40 to be stored under semiconductor gates at zones 44a and 44b. Low voltage signal components 70 and 72 prevent the signal charges from passing to semiconductor gates at zones 44c and 44d until, the vertical registers start to clock out. The charge signals are collected in the horizontal register as "odd" pulses 1, 3, 5, 7, 9 . . . 243 in signal 88 in the vertical register. This set of odd pulses forms one "odd" line of a frame of a video signal having a horizontal line time of 63.5 microseconds. It will be noted that pulses 240 and 242 are formed by an even field following the odd-field shown in FIG. 4.

Referring now to FIG. 3, transfer of photoelectric charges from even-field sensors is caused by a high level transfer signal component 76 on signal $\phi_3$, component 76 being immediately preceded and followed by intermediate voltage level signal components 78. Signal component 76 is 180 degrees out of phase with transfer signal component 62. Contemporaneous with signal component 76 are low voltage level signal component 80 of clock signal $\phi_4$, low voltage signal component 82 on clock signal $\phi_1$, and intermediate voltage signal component 84 on clock signal $\phi_2$. For the even-field transfer, the intermediate voltage level component 78 after transfer component 76 causes signal charges from sensors 42 to be temporarily stored under semiconductor gates at zones 44b and 44c until the vertical registers are clocked out. The charge signals are collected in the horizontal register in the form of a set of "even" pulses 0, 2, 4, 6, 8 . . . 242 in signal 88 in the horizontal register. This set of even pulses forms one even line of a frame of a video signal having a horizontal line time of 63.5 microseconds. It will be noted that pulses 239, 241 and 243 are formed from an odd-field subsequent to the even field depicted by FIG. 3.

It should be noted with respect to FIGS. 3 and 4 that, in our imaging technique, recurrences of transfer signal component 62 and transfer signal component 76 are separated only by the amount of time, $t_{ro}$, needed to read out an entire odd field or an entire even field. In other words, transfer signals are part of the following sequence: signal component 62 occurs, then signal component 76 occurs after interval $t_{ro}$, then signal component 62 reoccurs after another interval $t_{ro}$, and so on. In our technique, $t_{ro}$ was allowed to remain at 16.7 ms, so that successive occurrences of a transfer signal component are separated by 33 ms, whereby transfer signal components for a given field (odd or even) reoccur at a rate consistent with a standard RS-170 video signal format operating at 30 frames per second. It will be noted that a 33 ms time span between transfer signal components for a given field is also the camera's effective exposure time, i.e., the time during which sensors 40 and 42 are stimulated by target 12 to form an image.

In the particular camera system that we used, a horizontal blanking signal 63.5 microseconds long was added after each odd line of the video signal and a similar horizontal blanking signal was added after each even line of the video signal. The resulting four phased video signal completely filled the screen of the monitor 26. The successive horizontal monitor lines were in a sequence of even line, odd line, blanking line, and blanking line.

For reference, examples of the vertical blanking signals are shown, in FIGS. 3 and 4 at 74 and 92 on respective waveform lines $V_1$ and $V_2$ in their temporal relation to clock signals $\phi_1$, $\phi_2$, $\phi_3$ and $\phi_4$. Also shown in FIGS. 3 and 4 are vertical synchronization signals 90, on waveform line S one of which was added to each phase of the video signal in order to conform the video signal to a standard RS-170 format.

Figure 5:
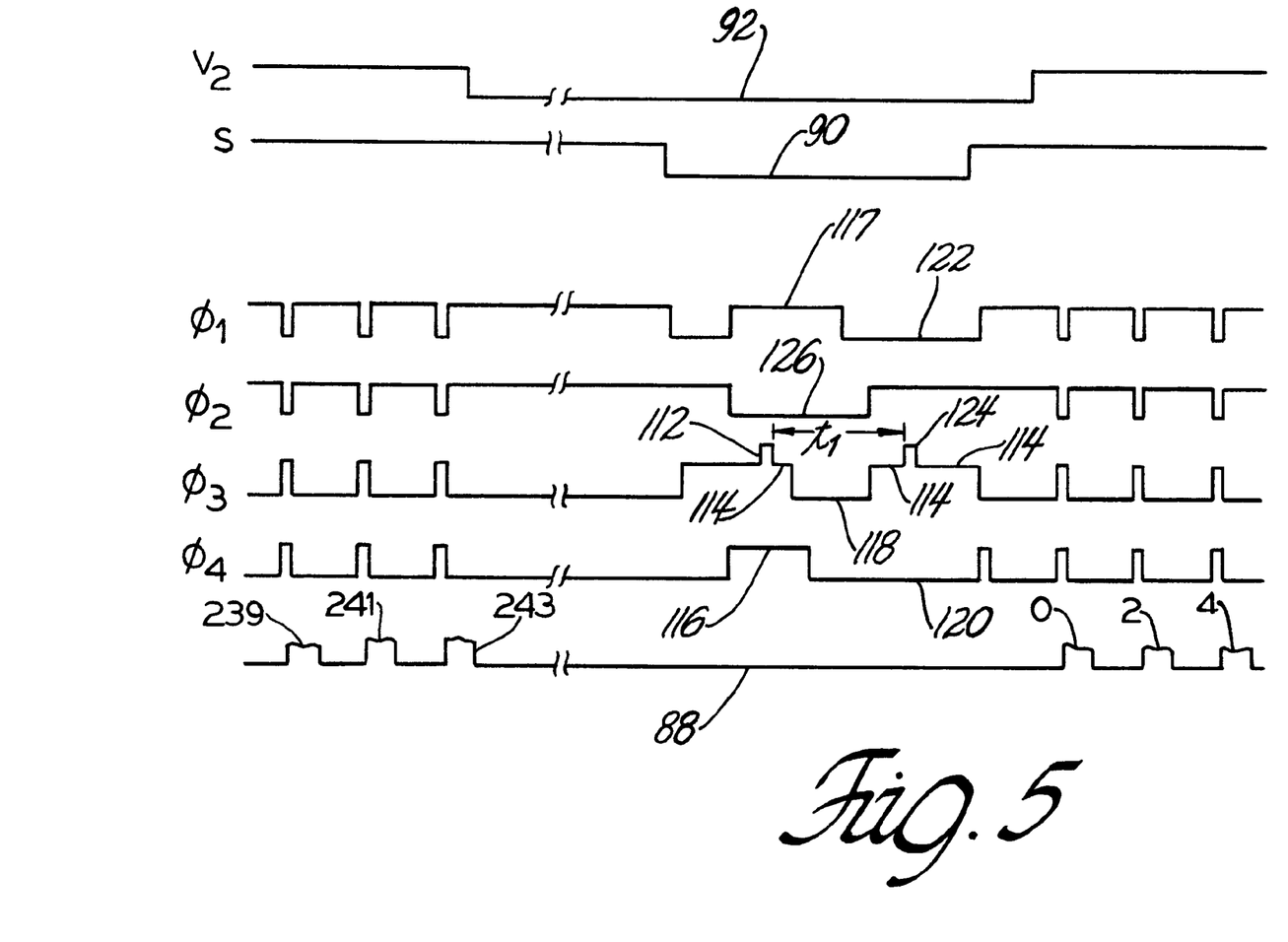
FIG. 5 is the FIG. 3 alignment as modified in accordance with our method.
Figure 6:
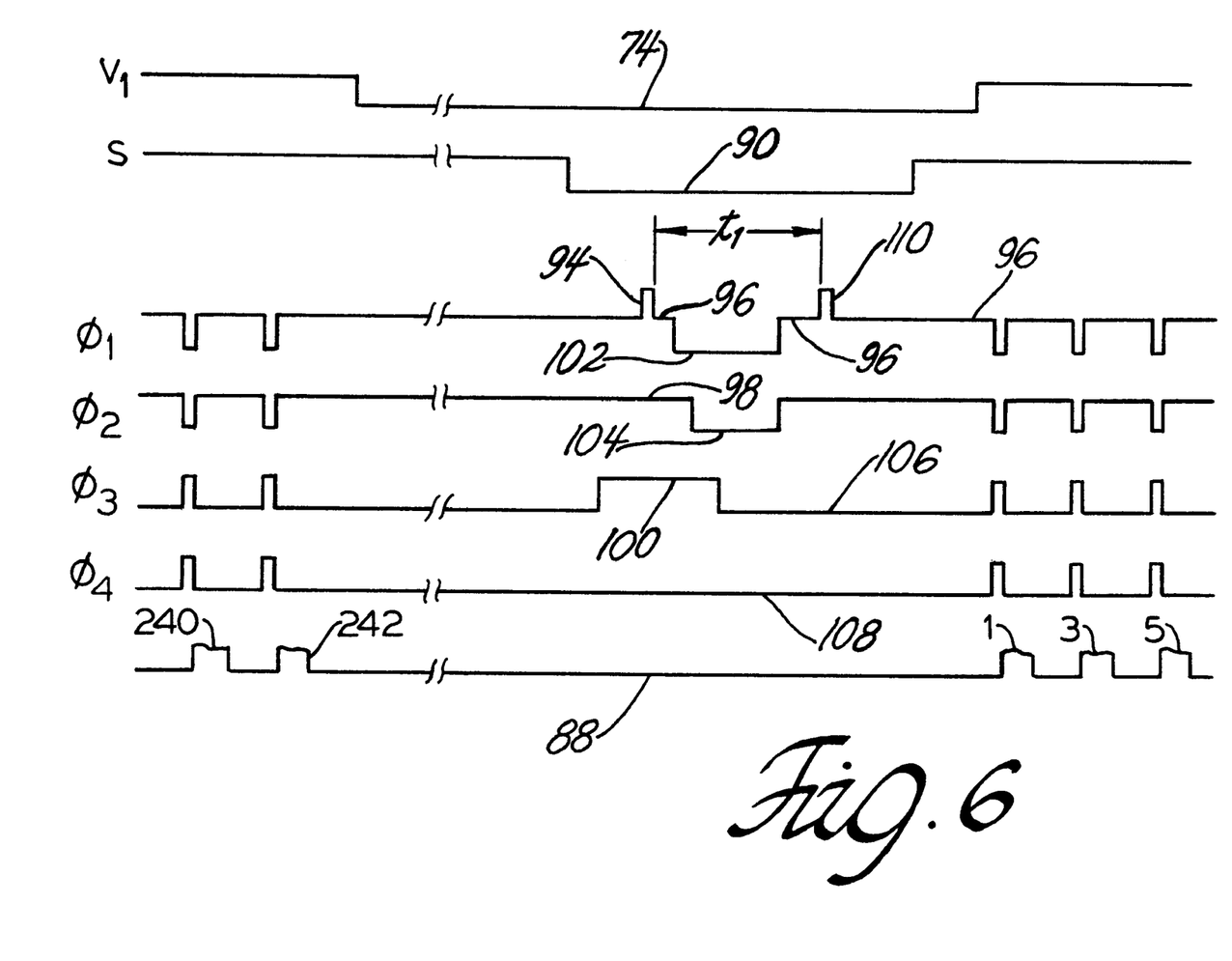
FIG. 6 is the FIG. 4 alignment as modified in accordance with our method.

Our technique changes the temporal juxtaposition and configurations of periodic clock signals $\phi_1$, $\phi_2$, $\phi_3$, and $\phi_4$ of FIGS. 3 and 4. The changes to the FIG. 3 signals are shown in FIG. 5 and the changes to the FIG. 4 signals are show in FIG. 6. Turning first to FIG. 6, clock signal $\phi_1$, has been modified to include a high voltage level dump pulse 94 which causes signal charges from odd-field sensors 40 to be transferred into zones 44a (FIG. 2) of the vertical registers 44. The signal charges are stored briefly at zones 44a, 44b and 44c by intermediate voltage levels at 96, 98 and 100 of clock signals $\phi_1$, $\phi_2$, and $\phi_3$. Thereafter the voltage level of signal $\phi_1$ goes to a low level 102, causing the potential wells to collapse at zones 44a so that the signal charges reassemble at zones 44b and 44c. Next, clock signals $\phi_2$ and $\phi_3$ sequentially drop to respective low voltage levels 104 and 106, causing the signal charges to be trapped in zones 44c and then be dumped to substrate 38 and thereafter dissipated. The ongoing low voltage level 108 on clock signal $\phi_4$ prevents any signal charge from travelling past zones 44c toward zones 44d.

The signal pulse previously residing in sensors 40 is effectively eliminated by the just-described clock signal manipulations, whereby sensors 40 are cleared to receive new stimuli from target 12. It is believed that the signal charge elimination process in the odd fields is enhanced by the aforementioned stepped movement of the signal charge from zones 44a to zones 44c before dissipating the signal charge to substrate 36. A potential advantage is that zones 44a will have a greater tendency to be completely free of hysterisis-causing charge before receiving a subsequent signal charge from sensors 40.

Still referring to FIG. 6, clock signal $\phi_1$ resumes its intermediate voltage level 96 at the end of low voltage level 102. Then intermediate level 96 is interrupted by high voltage level transfer pulse 110. New signal charges are transferred to zones 44a and 44b of vertical registers 44, but the new signal charges are not dumped or eliminated. Rather, the new signal charges are clocked down and off the vertical registers in the conventional manner described previously. It will be seen that the effective exposure time is $t_1$, the time between dump pulse 94 and transfer pulse 110 and that $t_1$ is considerably shorter than the effective exposure time of 33 ms extant in the absence of dump pulse 94. The minimum value for $t_1$ is limited by the recombination time of electrons dumped to the substrate by pulse 94, the recombination time being 5 microseconds with the particular sensor array and CCD used in our experiments.

Turning now to FIG. 5, clock signal $\phi_3$ has been modified to include a high voltage level dump pulse 112 which causes signal charges from even-field sensors 42 to be transferred into zones 44c, 44d and a second zone 44a (FIG. 2) of the vertical registers 44. The second zone 44a is not shown, but is just below zone 44d in FIG. 2 and is the same as the zone 44a which is shown. The second zone 44a receives the same clock signal, $\phi_1$, as does the zone 44a which is shown.) The signal charge is stored briefly at zones 44c, 44d and at a second zone 44a below zone 44d by intermediate voltage levels at 114, 116 and 117 of respective clock signals $\phi_3$, $\phi_4$, and $\phi_1$. Thereafter the voltage level of signal $\phi_3$ goes to a low level 118, causing the potential well to collapse at zone 44c so that the signal charge reassembles at zones 44d and second zone 44a. Next, clock signals $\phi_4$ and $0\phi_1$ sequentially drop to respective low voltage levels 120 and 122, causing the signal charge to be trapped in second zone 44a and then be dumped to substrate 38 and dissipated. The low voltage level 126 on clock signal $\phi_2$ prevents any signal charge from travelling downward past second zones 44a.

The signal pulses previously residing in sensors 42 are now effectively eliminated, whereby sensors 42 are cleared to receive new stimuli from target 12. As with the odd fields, it is believed that the signal charge elimination process in the even fields is enhanced by the stepped movement of the signal charge from zones 44c to second zones 44a before dissipating the signal charge to substrate 36. The advantage is that zones 44c will have a greater tendency to be completely free of hysterisis-causing charge before receiving a subsequent signal charge from sensors 42.

Still referring to FIG. 5, clock signal $\phi_3$ resumes its intermediate voltage level 114 at the end of low voltage level 118 and intermediate level 114 is then interrupted by high voltage level transfer pulse 124. New signal charges are transferred to zones 44c of vertical registers 44, but the new signal charges are not dumped or eliminated. Rather, the new signal charges are clocked down and off the vertical registers in the conventional manner. As with the odd field, it will be seen that the effective exposure time is $t_1$, the time between dump pulse 112 and transfer pulse 124.

Figure 7:
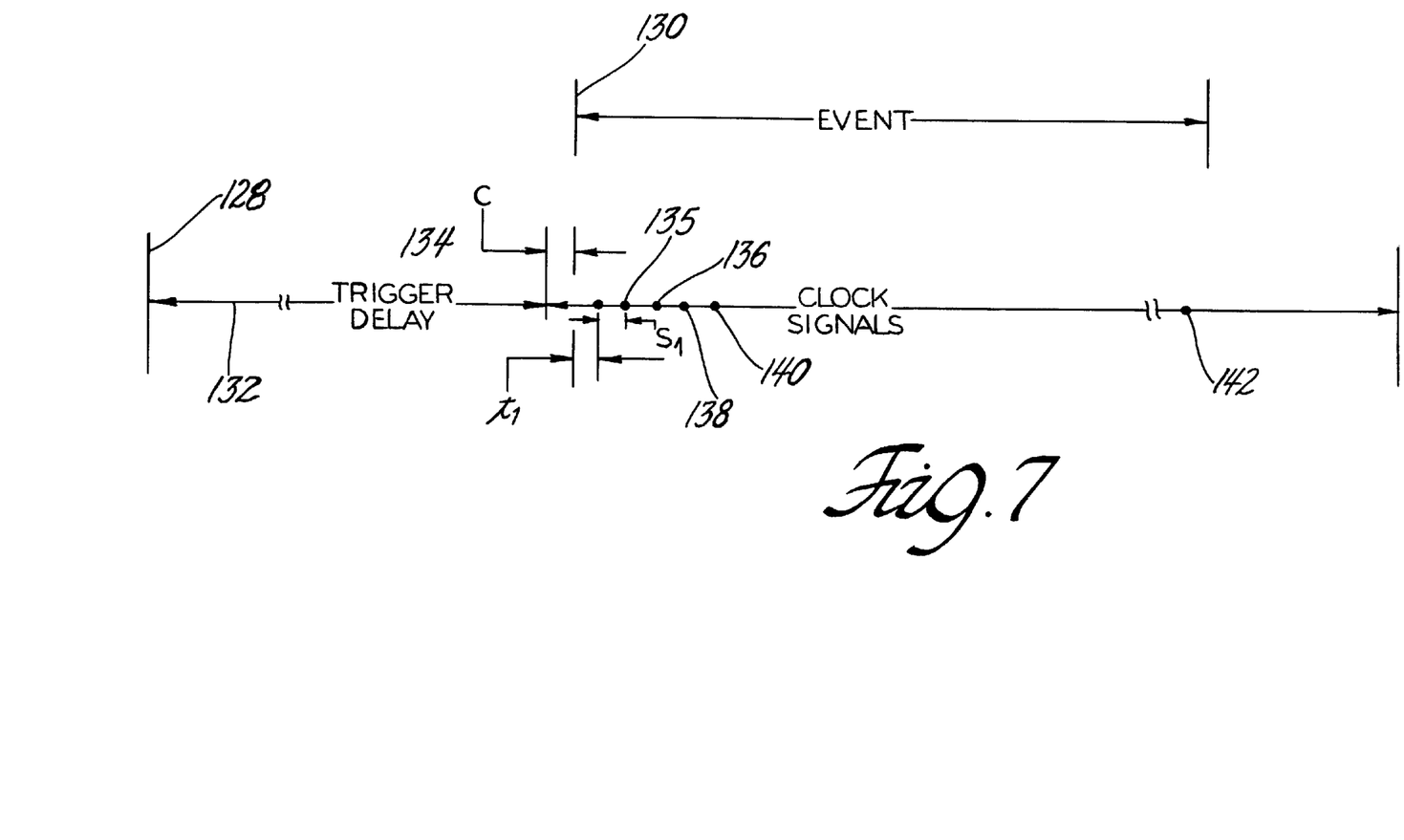
FIG. 7 is time line diagram showing the sequence of events in our imaging process.

Referring now to FIGS. 1 and 7, computer 24 is programmed to have at least one selectable mode where generator 22 initializes clock driver 30 only when computer 24 receives a trigger signal through external trigger terminal 32. The sequence of occurrences for this mode of the computer is shown in FIG. 7 wherein line 128 represents the time when the trigger signal is received at terminal 32. Normally, it is desired that the trigger signal occur some constant time before the beginning 130 of the event which is to be imaged. Therefore generator 22 will wait through a trigger delay 132 before initiating the clock signals, which then begin at time 134. It will take a constant time "c" before one of the clock signals has the appropriate dump pulse 94 or 112, which initiates the camera's effective exposure time $t_1$. The value for "c" will be zero if a dump pulse occurs at the start of the clock signals.

It is possible to take a series of images of a periodically recurring event so that the series of images are a "movie" showing sequenced stages of the event being imaged. After a first image of the event is taken and trigger generator 34 receives a second trigger signal, trigger generator 34 will add a time equal to $s_1$ to trigger delay 132. Consequently, effective exposure time $t_1$ occurs a time $s_1$ later, at 135, whereby a new portion of the recurring event is imaged. At each subsequent trigger signal, another time $S_1$ is added to trigger delay 132 whereby $t_1$ begins at points 136, 138, 140 successive images until an $n^{th}$ image is taken at point 142, where the addition to the trigger delay is $(n-1)s_1$.

We do not wish to be limited to the exact details shown and described since obvious modifications may occur to those skilled in the relevant arts that fall within the spirit and scope of the following claims.

We claim:

1. A method for imaging events, the method having one or more cycles, each of the cycles comprising:

providing a mechanically shutterless camera having a charge coupled device in which a detector field is defined by receptors arrayed in columns on the charge coupled device;

providing a gate in the field for each receptor;

providing a vertical register for each column of receptors, the vertical registers having zones in the detector field communicated to the gates;

providing a matrix enveloping the vertical registers;

sending a controlling signal to the gates on the charge coupled device associated with the receptors;

including a first signal component in the controlling signal, the first signal component causing first signal charges in the receptors to transfer to the zones;

dumping only once the first signal charges into the matrix directly from the vertical registers;

after the first signal component, waiting an unvarying interval, the unvarying interval having been chosen from a continuous range of exposure intervals including values less than 0.001 seconds;

allowing second signal charges to accumulate in the receptors for the duration of the interval;

including a second signal component in the controlling signal at the end of the selected interval, the second signal component causing the second signal charges to transfer to the vertical registers;

after the second signal component, manipulating all the second signal charges directly from the field to a horizontal register before further signal charges are accepted in the vertical registers or dumped to the matrix.

2. The method of claim 1 wherein the dumped first signal charge spreadingly disperses in the matrix at a rate limited only by the recombination constant of the matrix, and the minimum effective exposure time of the camera is as fast as the recombination constant of the matrix.

3. A method for imaging events, the method having one or more cycles, each of the cycles comprising:
providing a mechanically shutterless camera having a charge coupled device in which a detector field is defined by receptors arrayed in columns;
providing gates in the field for the receptors;
providing a vertical register for each column of receptors, the vertical registers having proximal zones communicated to the gates;
providing a matrix enveloping the vertical registers;
sending a controlling signal to the gates;
sending clock signals to distal zones of the vertical registers, the distal zones being farther from the gates than the proximal zones;
including a first signal component in the controlling signal, the first signal component causing first signal charges in the receptors to transfer to the proximal zones;
transferring at least a portion of the first signal charges from the proximal zones to the distal zones;
using dump signal segments in the clock signal to effect a one-time dump of the first signal charges in the distal zones into the matrix, whereupon the first signal charges disperse;
timing at least portions of dump signal components in the controlling signals to coincide with the dump signal segments of the clock signal;
wherein the dump signal components cause a once-occurring dump of any signal charges in the proximal zones into the matrix;
establishing a range of exposure intervals, the range including values of less than 0.001 seconds;
after the first signal component, waiting an unvarying interval chosen from the range;
allowing second signal charges to accumulate in the receptors for the duration of the interval;
including a second signal component in the controlling signal at the end of the interval, the second signal component causing the second signal charges to transfer to the vertical registers;
after the second signal component, manipulating all the second signal charges directly from the field to a horizontal register before further signal charges are accepted in the vertical registers or dumped to the matrix.

4. A method for imaging events, comprising:
providing a mechanically shutterless camera having a charge coupled device in which a detector field is defined by receptors arrayed in columns on the charge coupled device;
providing gate in the field for each receptor;
providing a vertical register for each column of receptors, the vertical registers having sets of zones in the detector field communicated to the gates, the sets of zones each having a first zone, a second zone adjoining the second zone and a third zone adjoining the second zone, wherein the second zone is farther from the receptor than the first zone and the third zone is farther from the receptor than the second zone;
providing a matrix enveloping the vertical registers;
performing a sequence comprised of
(a) transferring first signal charges in the receptors to the sets of zones,
(b) next, transferring the first signal charges from the first zones to the second and third zones,
(c) then transferring the first signal charges from the second zones to the third zones,
(d) last, dumping of the first signal charges into the matrix directly from the second and third zones;
establishing a range of exposure intervals;
after the dumping, waiting a selected interval chosen from the range and allowing second signal charges to accumulate in the receptors for the duration of the selected interval;
transferring the second signal charges to the vertical registers;
after transferring the second signal charges, manipulating all the second signal charges from the field to a horizontal register.

5. The method of claim 4 wherein the manipulating of the second signal charges from the field to the horizontal register occurs before further signal charges are accepted in or dumped from the vertical registers.

6. The method of claim 5 wherein the dumping of the first signal charges occurs only once before second signal charges accumulate in the receptors.

7. The method of claim 5 wherein the selected interval remains constant for recurrences of the second charges.

8. The method of claim 6 wherein the selected interval remains constant for recurrences of the second charges.

* * * * *